United States Patent

Stephansky et al.

[11] Patent Number: 5,151,200
[45] Date of Patent: Sep. 29, 1992

[54] HIGH ALUMINIA TAR-IMPREGNATED PRESSURE POURING TUBES

[75] Inventors: John J. Stephansky, Fair Oaks, Pa.; John P. Sutton, Redmond, Wash.

[73] Assignee: Dresser Industries, Inc., Dallas, Tex.

[21] Appl. No.: 744,676

[22] Filed: Aug. 9, 1991

Related U.S. Application Data

[63] Continuation of Ser. No. 258,192, Oct. 14, 1988, abandoned.

[51] Int. Cl.⁵ .................................. B22D 41/54
[52] U.S. Cl. ....................... 222/590; 222/606; 222/607
[58] Field of Search ............ 222/590, 591, 594, 606, 222/607, 600; 266/44, 275, 236; 264/30

[56] References Cited

U.S. PATENT DOCUMENTS

| 2,275,702 | 3/1942 | Thomas | 222/606 |
| 4,257,542 | 3/1981 | Aller et al. | 222/600 |
| 4,585,485 | 4/1986 | Shikano et al. | 501/105 |

FOREIGN PATENT DOCUMENTS

2154708  9/1985  United Kingdom ............ 222/594

Primary Examiner—Scott Kastler

[57] ABSTRACT

An improved metal pouring tube especially adapted for conducting molten metal such as liquid steel, the tube being formed of carbon-impregnated ceramic-bonded refractory material principally comprising alumina, zirconia and silica. Also included is the method of forming the tube.

7 Claims, 1 Drawing Sheet

HIGH ALUMINA TAR-IMPREGNATED PRESSURE POURING TUBES

This application is a continuation, of application Ser. No. 258,192 filed Oct. 14, 1988, now abandoned.

BACKGROUND OF THE INVENTION

This invention relates to molten metal pouring tubes, and more particularly to such tubes that are specially adapted for the pouring of molten steel.

As is known to those skilled in the art, molten metal pouring tubes are an important part of the equipment used to fill metal moulds from the bottom. From a molten metal laden receptacle (such as a ladle), usually located beneath the mould, the molten metal passes through a pouring tube essentially vertically to the underside of the selected mould. Application of pressure to the surface of the molten metal forces metal upwardly through the pouring tube and thence through a gated mating aperture in the base of the mould into the interior thereof. Accordingly, by regulating the pressure of the air or other gaseous substance onto the surface of the molten metal, the flow of such metal upwardly into a mould can be controlled.

The bottom introduction of molten metal into certain special moulds has found substantial commercial favor, particularly in the field of direct steel slab casting. However, although such bottom entry molten metal casting provides a number of advantages, the harsh environment of extraordinary high temperatures has resulted in limited tube life. Moreover, heretofore known tubes that are capable of withstanding molten steel temperatures and the pressures of vertical columns of significant height have been expensive and relatively shortly lived; and consequently there has been a continuing need for molten metal pouring tubes with substantially improved operational life.

OBJECTS AND FEATURES

It is one general object of this invention to improve molten metal pouring tubes.

It is another object to increase the operational life of such pouring tubes.

It is yet another object of the invention to provide long life pouring tubes at reduced cost.

Accordingly, and in accordance with one feature of the invention, a molten metal pouring tube is formed of ceramic-bonded alumina which is tar impregnated and baked at high temperatures for curing.

In accordance with yet another feature of the invention, through the advantageous inclusion of tar impregnation and high temperature baking, resistance to slag line wear is substantially reduced and thermal shock resistance increased, thus contributing significantly to operational tube life.

In accordance with still another feature of the invention, a carbon residual remaining in the porous structure of the internal surfaces of the tube imparts thereto an attractive non-wetting characteristic.

In accordance with still a further feature of the invention, in addition to the advantageous inclusion of the ceramic-bonded characteristic of the pouring tubes, the residual carbon within the tubes is less susceptible to the deleterious effects of oxidation, thereby further improving tube life.

These and other objects and features of the invention will be apparent from the following detailed description, by way of preferred embodiment, with reference to the drawing in which like parts are identified with like numbers.

DETAILED DESCRIPTION

Figure 1:
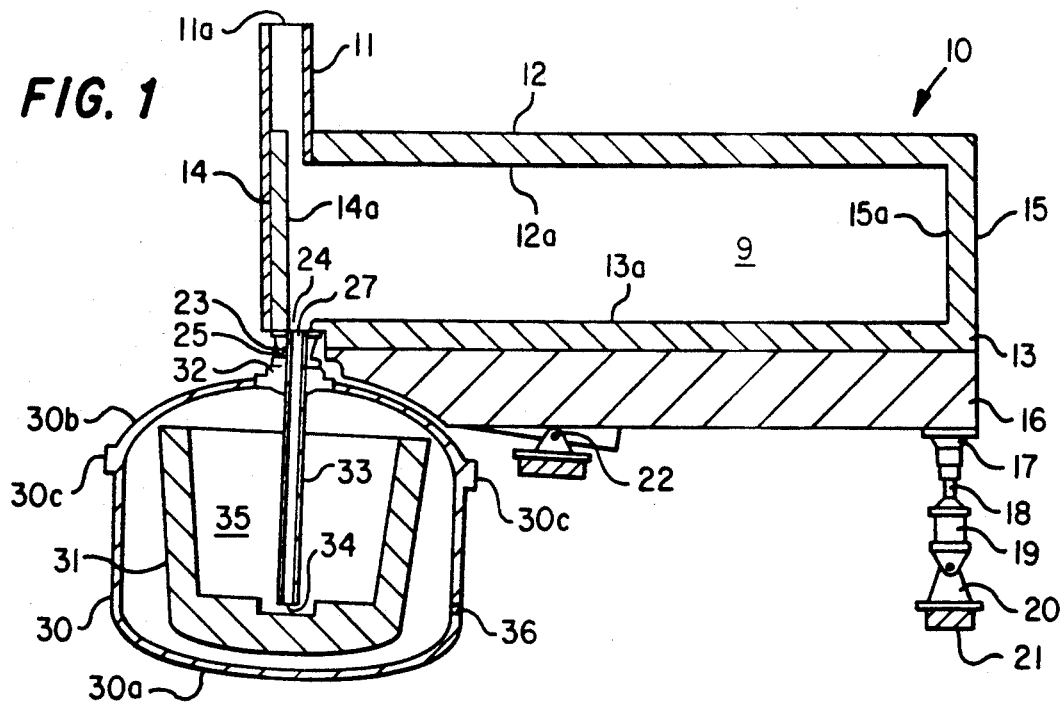
FIG. 1 is a schematic representation of one prior art apparatus making use of molten metal pouring tubes.

Now turning to the drawing, and more particularly FIG. 1 thereof, it will be observed that it depicts prior art apparatus for bottom pressure casting steel slabs. For additional details on the bottom pressure casting of steel, reference is hereby made to an article titled "Eccentric Bottom Tapping and More at Oregon Steel Mills", at pages 24–36 of the Nov. 1986 issue of the "Iron and Steel Engineer". This apparatus comprises an inner molten steel receiving space 9 formed by bottom 13, left side 14, top 12 and right-hand side 15. As will be evident to those skilled in the art, the interior surfaces 12a, 13a, 14a and 15a are lined with suitable conventional refractories that are well known in the art. Extending vertically adjacent to sidewall 14 is vertical riser 11 which communicates with the interior 9 as shown and which includes an opening 11a at the top thereof so as to provide a means for venting space 9.

The mould 10 is generally supported by mould support 16 which is connected at its right lower extremity via connecting member 17 and linkage 18 to tilt cylinder 19 which may be controllably activated to extend or retract linkage 18 to raise or lower the right side of the mould. As is known to those skilled in the art, when a pour is about to occur, linkage 18 is extended so as to raise the right hand side of the mould and facilitate the even distribution of the molten metal within chamber 16. When the pour is completed and the molten metal has become solidified, linkage 18 is retracted within tilt cylinder 19, thereby returning the mould to an essentially horizontal condition.

Further reference to FIG. 1 reveals the provision of pivot 22. As will be observed from the drawing, pivot 22 provides a pivoting support for the lower surface of mould support 16 and provides a ready point about which see-saw movement can occur so that extension of linkage 18 can readily raise the right-hand side of mould support 16 and correspondingly lower the left-hand portion of the mould.

Within the lower left interior of mould 10 there is positioned a gate member 23 that is removably secured by a securing means (not shown). Gate member 23 includes a collar 25 adapted for sealed engagement with opening 24 in mould 10. Within collar 25, which is generally circular in external geometry, there is an axially disposed cylindrically shaped aperture 27 that is adapted for engagement and axial alignment with a pouring tube constructed in accordance with the invention.

In order to controllably provide molten metal for passage vertically through cylindrical aperture 27 (which, incidentally, is lined on its interior surfaces with a conventional refractory material), there is provided a pressure vessel 30 which encloses a conventional ladle 31. Pressure vessel 30 is seen to include a lower section 30a and an upper section 30b which are joined together by a suitable seal at joint 30c. In the center of cover 30b there is disposed a detachable collar 32 which includes a cylindrical aperture adapted for engaging and supporting the pouring tube 33. Pouring tube 33 is open at its lower extremity 34 in order to provide an opening into which molten metal within the interior 35 of ladle 31 may flow. Since pouring tube 33 is axially aligned with cylindrical aperture 27, it will be evident that there is provided an axially aligned path through which metal may flow from the interior 35 of ladle 31 into lower opening 34 within pouring tube 33 and thence vertically through pouring tube 33 and axially aligned mating aperture 27 to the interior 9 of slab mould 10.

Further reference to pressure vessel 30 reveals the provision of an air inlet connection 36 which is adapted for connection to any suitable source of pressurized air or other gas (not shown) for the controlled pressurization of the interior of pressure vessel 30 and correspondingly to impart pressure to the surface of any molten metal resident within interior 35 of ladle 31. As is well known to those skilled in the art, the provision of sufficient air pressure on the surface of the molten metal within the ladle will result in its vertical flow through pressure tube 33 and mating aperture 27 to the interior 9 of slab mould 10. When the mould is filled, gate member 23 is activated to close aperture 27, and tilt cylinder 19 is subsequently deactivated to retract linkage member 18 and return the slab mould 10 to an essentially horizontal position. Coincident therewith, the bottom of gate 23 is separated from the mating upper surface of collar 32, thereby separating pressure vessel 30 from mould 10 and readying pressure vessel 30 for movement to a location suitable either for refilling the ladle or for connection to another mould (not shown).

As mentioned previously, the environment in which the pouring tube is required to operate is extremely harsh. This results not only from the extremely high temperatures of the molten metal but additionally from the slag that unavoidably develops, and from the abrasive qualities of the slag and steel mixture. In addition, the pouring tube must inherently be sufficiently strong and resilient to withstand normal impact and other stress-producing incidents, such as thermal shock, typically occurring in heavy industrial applications such as those of steel fabricating facilities.

Figure 2:
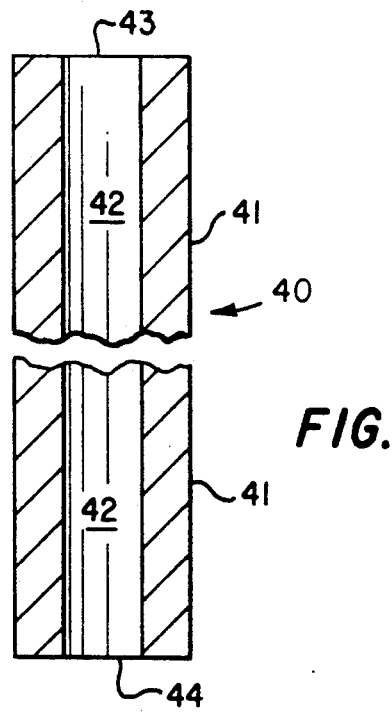
FIG. 2 is a sectional view of a pouring tube constructed in accordance with the principles of the instant invention.
Figure 3:
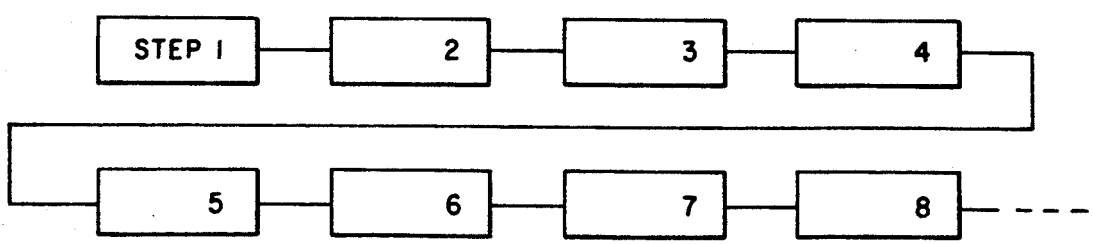
FIG. 3 is a flow diagram depicting the steps involved in the manufacture of the improved pouring tubes.

Typically, a pouring tube is at least 10 feet in length with an outside diameter of 10 inches or more, inside diameter of 5 inches or more and side wall thickness of approximately 2½ inches. Such construction is portrayed in FIG. 2, where it will be observed there is shown, in section, a cylindrical pouring tube 40 having walls 41 enclosing a space configured as cylindrical region 42. Cylindrical region 42 is open at its upper end 43 and its lower end 44 so as to form a conventional tube-shaped geometry.

The tube is formed from a high alumina-containing refractory mix which also contains zirconia, and preferably some silica. The preferred source of alumina is mullite although the known clay minerals high in alumina can also be utilized. The mullite also contains silica.

As to the zirconia, it is preferably fused zirconia, although any other source is suitable. The silica can be added as sand, quartz, sandstone and the like.

As to proportions, the refractory mix contains from about 75 to 96 weight % alumina and 4 to 25 weight % zirconia. If silica is utilized, it is used in an amount up to 20 weight %.

The refractory components are admixed and water is added in conventional amounts; i.e., an amount giving the consistency required for moulding. The optimum amount of water is determined for each particular mix by routine experimentation.

The walls 41 of pouring tube 40 are made of this high alumina refractory mix. This tube is ceramic bonded and is fired at a very high temperature.

After firing, it is carbon impregnated with a carbonaceous material such as a tar or other carbon-containing material conventionally used to impregnate refractory shapes. Thus, after heating and baking, carbon which is present at the exposed surfaces of the tube provides a non-wetting characteristic which is efficacious in reducing slag line wear and deterioration of the exposed surface which, in wetted surface conditions, is dramatically accelerated.

Examples of the fabrication and testing of pouring tubes constructed in accordance with the principles of the invention are set forth in the Examples that follow which are set forth for purposes of illustration only.

EXAMPLES 1 TO 4

A series of four pouring tubes were cast in a twopiece plaster mould that was set on a vertical vibratable table. The mould was equipped with an auxiliary vibrator positioned approximately halfway up the mould. A core was positioned within the exterior two-piece plaster mould in order to provide for a central opening extending throughout the tube. There was then introduced into the top of the mould material principally comprising mullite and zirconia. These components were thoroughly mixed before being poured into the mould. While pouring was taking place, the vibrators were activated so as to insure a thorough compacting of the material.

A chemical analysis of these materials revealed the approximate following percentages: silica ($SiO_2$), approximately 14.8%; alumina ($Al_2O_3$), 79.3%; titania, 0.2%; zirconia ($ZrO_2$), 5.2%; alkalies ($Na_2O + K_2O + Li_2O$), 0.2%; and the remainder, minor quantities of iron oxide, lime and magnesia. The casting time approximated 30 minutes. After about 5 hours, the core of the mould was withdrawn and the contents permitted to dry overnight. The exterior portion of the mould was then stripped, and the tubes were set on a cradle and positioned within a dryer for 48 hours, maintained at a temperature of 250° F. Thereafter, the tubes were positioned in a kiln and fired at 2600° F. for 5½ days. When cool, they were saw-cut on one end in order to insure the correct length of 10 ft. The tubes were then examined carefully for any imperfections.

After firing, several of the tubes were placed in a stainless steel cradle, which was then top-loaded into an autoclave. The autoclave was then heated to temperatures in the range of from 536°–672° F. and a tar (pitch) having a 240° F. melting point was then poured into the autoclave and covered the pouring tubes. The autoclave was then sealed and subjected to a vacuum which varied between 4 and 12 millimeters of mercury for a period of 30 minutes in order to achieve outgassing of the pouring tube surfaces and in order to render them more receptive to tar impregnation. The vacuum was then relieved and the interior of the autoclave was pressurized to a pressure in the range of 80–100 lbs. per square inch for several hours. The pressure was then relieved and the tubes were withdrawn and placed on a stainless steel sagger. The sagger, together with the tubes, was then placed upright in a large car bottom furnace in which the atmosphere was controlled to maintain reducing conditions. The furnace was then heated to a temperature of approximately 1470° F. The total time, including loading, unloading, heating and cooling, was seven days.

TEST RESULTS

The four pressure tubes prepared in accordance with the foregoing examples were tested with bottom pressure casting apparatus similar to that described above. Three of these tubes were put into experimental service and provided an average life of 16 slab pours, as contrasted with an average life of previous pouring tubes represented by the prior art of 10 pouring slabs. Thus, it is observed that the average life expectancy was increased from an average of 10 to 16, which is an increase of 60%.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A vertical molten metal pressure pouring tube for vertical pressuring pouring of a mold from the bottom thereof wherein molten metal contacts said tube on the interior and exterior surfaces thereof, said tube having a substantially uniform wall thickness; said wall being formed of a carbon impregnated fired refractory composition consisting essentially of alumina and zirconia and wherein residual carbon is retained in said wall when said tube is utilized under oxidizing conditions in bottom pressure pouring of a molten metal under a temperature and pressure which would normally completely oxidize the carbon.

2. A molten metal pouring tube according to claim 1 in which said zirconia is fused.

3. A vertical molten metal pressure pouring tube for vertical pressure pouring of a mold from the bottom thereof having an elongated shape with a first end and a second end and having a wall formed of an exterior annular surface and a corresponding inner annular surface thereby rendering the wall thickness substantially uniform, said wall thickness being sufficient to withstand the weight of a column of molten metal therein, said pouring tube being formed of a carbon impregnated refractory composition consisting essentially of mullite and fused zirconia and having residual carbon retained in said wall when said tube it utilized under oxidizing conditions in bottom pressure pouring of a molten metal under a temperature and pressure which would normally completely oxidize the carbon.

4. A molten meal pouring tube according to claim 3 wherein said refractory composition further includes silica.

5. A method of making a vertical molten metal pouring tube comprising the steps of:
   (a) admixing mullite and zirconia to produce a refractory mix having alumina in the range of about 75 to 96 weight percent and zirconia in the range of between about 4 to 24 weight, (b) introducing said mix into an elongated mould of annular cross section to create a tube-like form, (c) removing said mould, (d) drying said form, (e) heating said form at a temperature and for a time sufficient to fire said form, (h) outgassing the surfaces of said form, and (g) impregnating the said form with carbon.

6. The method of claim 5 comprising the steps of:
   (a) mixing mullite and zirconia to produce a refractory mix having about 79 weight percent alumina, about 5 weight percent zirconia, and about 15 weight percent silica;
   (b) moulding said mix to form a tube-like member;
   (c) drying said member;
   (d) heating said member at a temperature and for a time sufficient to fire said member; and
   (e) impregnating said member with a carbonaceous material.

7. A molten metal pouring tube according to claim 1 wherein said wall is both uniform in diameter and thickness.

* * * * *